July 12, 1932.  F. E. GRAGG ET AL  1,866,802
DIRECTIONAL SIGNAL
Filed May 29, 1929  2 Sheets-Sheet 1
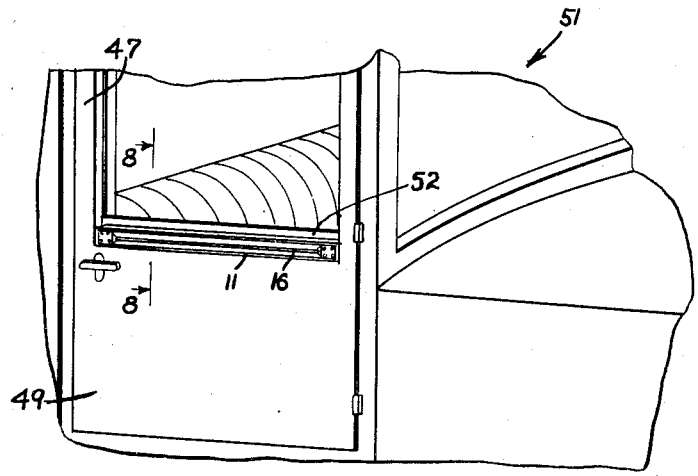
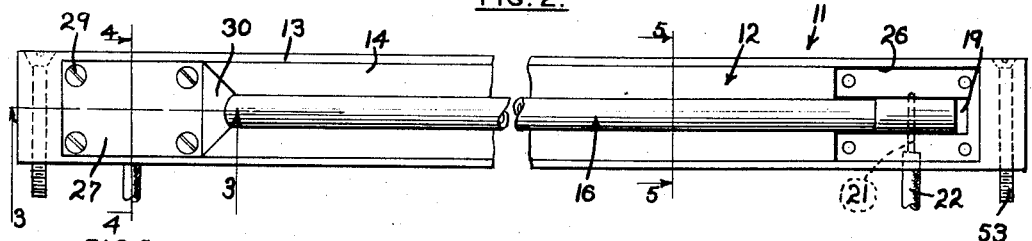
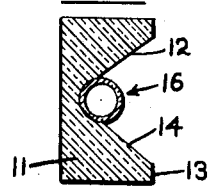
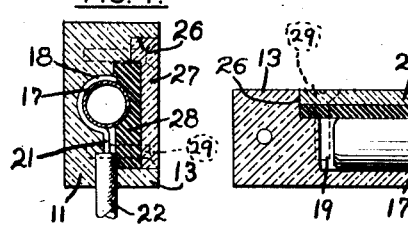
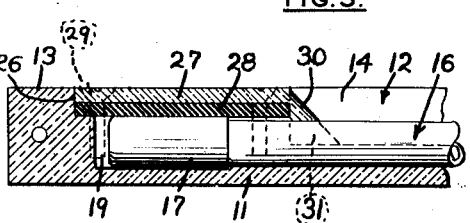
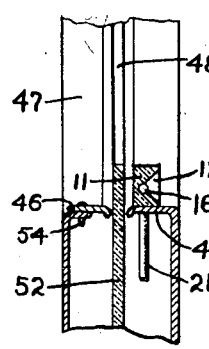
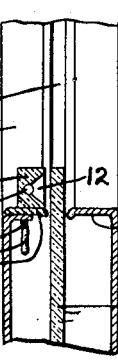
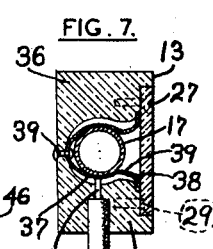
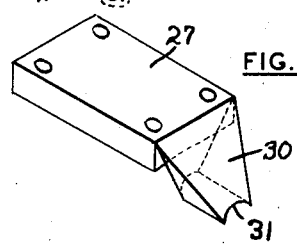
INVENTORS
F. E. GRAGG
L. B. COHN
BY Hazard and Miller
ATTORNEYS July 12, 1932. F. E. GRAGG ET AL 1,866,802
DIRECTIONAL SIGNAL
Filed May 29, 1929  2 Sheets-Sheet 2
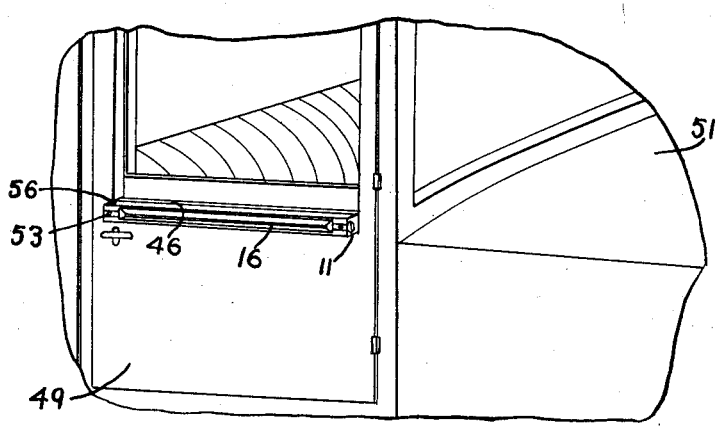
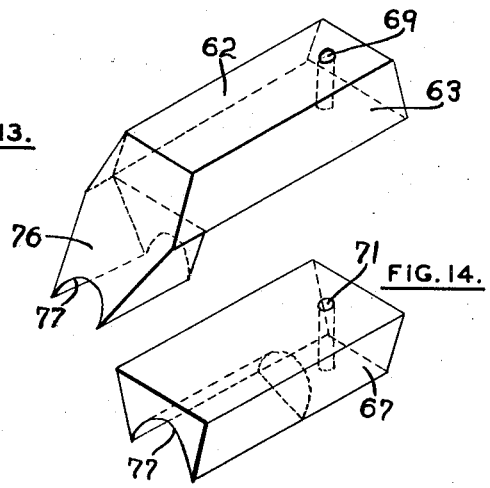
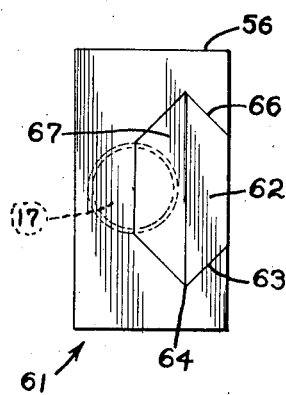
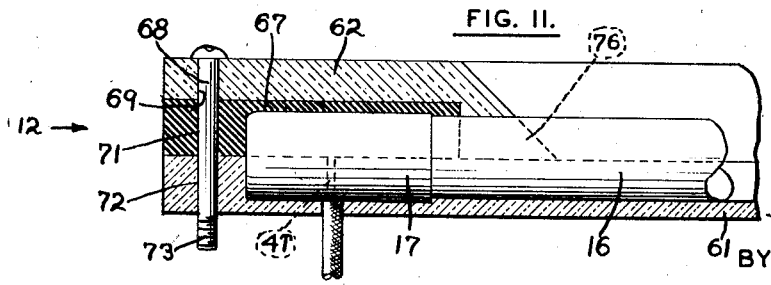
INVENTORS
F.E. GRAGG
L.B. COHN
BY Hazard and Miller
ATTORNEYS Patented July 12, 1932

1,866,802

UNITED STATES PATENT OFFICE

FRANCES ETHEL GRAGG AND LEONARD B. COHN, OF LOS ANGELES, CALIFORNIA, ASSIGNORS TO EDMUND C. HAMES, OF LOS ANGELES, CALIFORNIA

DIRECTIONAL SIGNAL

Application filed May 29, 1929. Serial No. 367,030.

Our invention relates to signals for such vehicles as automobiles.

An object of the invention is the provision of a vehicle signal, the essential characteristic of which is that it appears to the observer, as a line of light disposed in substantial parallelism with the longitudinal axis of the vehicle upon which the signal is mounted. As a result, the signal is capable of indicating the direction of movement of the vehicle, or, if the vehicle is standing, the direction in which the vehicle is facing.

The device of the present invention constitutes an improvement over that forming the subject matter of our copending application, Serial No. 352,275, filed April 3, 1929.

A more detailed object is the provision of a signal as described, which is capable of being mounted in operative position upon a vehicle, with a minimum of labor, and without the necessity of employing other than the simplest of tools.

Another object is the provision of a linear signal of the general character described, of an especially convenient and compact design, which renders the device adaptable for mounting without materially harming the surface of the vehicle.

A further object is the provision of a vehicle signal, one of the constituent elements of which is an elongated, luminous element suitably mounted within a backing or housing particularly adapted for mounting upon the sill of one of the windows of an automobile. This construction affords a particularly convenient arrangement, and one which is capable of being mounted in operative position very easily, and yet which yields a device having a very neat, attractive and finished appearance after having been so installed.

A still further object is the production of a vehicle signal of the general character described, the cost of which has been reduced to a minimum.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a perspective view of a portion of an automobile with one embodiment of the signal of the present invention mounted in operative position thereupon;

Fig. 2 is an enlarged view in side elevation, of the signal device of Fig. 1. A portion of the Figure is broken away to reduce its length;

Fig. 3 is a horizontal sectional view of one end of the device, the plane of section being indicated by the line 3—3 of Fig. 2, and the direction of view by the arrows;

Fig. 4 is a vertical, transverse sectional view taken upon the line 4—4 of Fig. 2, with the direction of view as indicated;

Fig. 5 is a vertical, transverse sectional view taken upon the line 5—5 of Fig. 2, with the direction of view as indicated;

Fig. 6 is a perspective view of one of the plates whereby the luminous element is releasably retained within the housing;

Fig. 7 is a view similar to Fig. 4, but showing a slightly modified form of electrical contact;

Fig. 8 is a vertical sectional view of a portion of the vehicle door of Fig. 1. The plane of section is taken upon the line 8—8 of Fig. 1, and the direction of view is indicated by the arrows;

Fig. 9 is a view similar to Fig. 8, but showing the signal device mounted upon the interior of the vehicle;

Fig. 10 is a perspective view similar to Fig. 1, showing the signal mounted in a slightly different position upon the vehicle;

Fig. 11 is a horizontal sectional view of a slightly modified form of the signal device;

Fig. 12 is an end elevation taken in the direction of the arrow 12 of Fig. 11;

Fig. 13 is a perspective view of the modified form of plate adapted for use with the embodiment of Figs. 11 and 12;

Fig. 14 is a perspective view of the cushioning block.

In its broader aspect, the signal device of the present invention comprises an elongated housing having a luminous, linear lamp disposed within a groove extending longitudinally in one face thereof. While any type of luminous element may be employed, the signal of the present invention lends itself particularly well to the employment therewith of the well known glass tube filled with a gas of such characteristics that it becomes luminous in the presense of an electrical discharge. This type of luminous element is particularly well adapted for use with our vehicle signal, inasmuch as it emits an exceedingly penetrating light, thus increasing the efficacy of the signal, and furthermore, because of the appearance of such a lamp as a line of light, inasmuch as the signal is to be positioned with this line of light in parallelism with the path of movement of the vehicle. Consequently, the signal is capable of indicating instantaneously to an observer, the direction in which the vehicle is moving, or in which the vehicle is facing, should it be stationary. Such a signal will be conducive to safety, not only to the vehicle upon which the signal is mounted, but to other vehicles as well, inasmuch as it will reduce to a minimum, the danger of collisions upon crowded thoroughfares and intersections. The elongated nature of the luminous element, not only adds to its visibility because of the larger size of the source of light, but it also indicates at a glance, the direction in which the vehicle is moving, thus making it easier for another vehicle to avoid striking or being struck by a vehicle carrying the signal. It frequently occurs during the evening hours, and more especially upon crowded thoroughfares, that the driver of one vehicle, being blinded by the many headlights of other vehicles is unable to discern a car crossing in front of him, inasmuch as the headlights of the latter car are not visible to him. By mounting signals of our invention, on the sides of an automobile, such a possibility is overcome; and inasmuch as the preferred embodiment of the present invention, can be constructed and sold to the public at relatively low cost, it will serve to materially reduce traffic accidents.

Specifically describing the preferred embodiment of the invention, we have provided an elongated housing 11 preferably rectangular in cross section and having a groove 12 in the outer face 13 thereof. This groove 12 extends longitudinally of the housing 11, and its side walls 14 converge towards the bottom of the groove as best shown upon Fig. 5. This housing 11 may be constructed of any suitable dielectric and opaque material, but we prefer to use a material of any well known phenolic condensation product, in that it lends itself particularly well to the present use as a result of its high insulating qualities and its inherent strength which results in its affording adequate protection for the relatively fragile, luminous element 16 which is disposed within the bottom of the groove 12 extending longitudinally of the housing 11.

This luminous element 16 may also be of any suitable nature, provided it is elongated and relatively narrow, the purpose being to present to the observer, a line of light. The well known neon tube is the character of luminous element best suited to the present use, in so far as we are informed at present, because of the highly penetrating quality of the light emitted thereby, and because many different colors of light may be obtained by such means. Furthermore, the neon tube is particularly well adapted for use as a vehicle signal, inasmuch as it is not subject to deterioration or injury by the vibration to which it will be subjected when carried by an automobile.

Inasmuch as the gas with which such a tube is filled, requires an electrical discharge to effect luminosity thereof, each end of the tube is provided with a suitable electrode 17 adapted to be engaged by a contact 18, one of which is provided adjacent each end of the housing 11 within an enlarged portion 19 of the groove 12. A suitable electrical conductor 21 provided with insulating material 22, is associated with each contact 18 to effect proper energization thereof.

A preferably rectangular socket 26 is formed in the face 13 of the housing 11 adjacent each end thereof, for the reception of a plate 27 which preferably fits nicely therein. A block 28 of rubber or other suitable resilient material, is carried by each of the plates 27 upon the inner face thereof, to engage the associated end of the tube 16 to resiliently press the associated electrode 17 against its contact 18. A plurality of screws 29 extend through apertures in the plate 27, and are threaded into the body of the housing 11, to releasably retain each plate in that position in which the tube 16 is pressed against the bottom of the groove 12, and the electrodes 17 are pressed against their respective contacts 18. Each plate is provided with an extended foot 30 at the inner end thereof, having a concave surface 31 conforming to the tube 16 and engageable therewith as the plate 27 is pressed home within its socket 26, thus securely clamping the tube 16 against any possible vibration within the housing 11.

Fig. 7 shows a modified form of electrical contact. The housing 36 is here provided with a larger space 37 adjacent each end within which a U-shaped spring contact 38 is retained as by a rivet 39. The parts are so proportioned that one of the electrodes 17 may be forced between the legs of the contact 38, to spread them and permit the electrode to be snapped past the restricted portion 39 of the spring contact, to resiliently and releasably retain the tube 16 in proper position. The spring contacts 38 are also provided with electrical conductors 41; and the same type of clamping plate 27 may be employed to prevent inadvertent displacement of the tube 16.

While the signal above described may be mounted in any convenient location upon the vehicle, such as upon the panel of one of the doors, extending along the edge of the roof, or just below the edge of the running-board, or in fact, in various other localities, the present embodiment has been particularly designed for installation as best shown upon Figs. 1, 8, and 9. Here the housing is so proportioned that it is receivable upon the sill 46 and between the jambs 47 defining the bottom and sides of a window light 48 in preferably the forward door 49 of a closed automobile 51 of the sedan type. As clearly shown upon Fig. 1, the housing 11 is so proportioned that it extends from one jamb 47 to the other, and is seated upon the sill 46 outside the pane 52 of glass which is adjustably carried by the door 49. In Fig. 9, the device is similarly mounted with the exception that it is disposed inside the pane 52 instead of outside. The advantage of this latter installation is that the pane 52 may be moved to closed position, and the doors of the car locked so as to protect the device against being stolen while the car is unattended.

The housing 11 is intended to be rigidly secured to the sill 46, by means of screws 53 or their equivalent. These screws are preferably of countersunk type and extend through apertures adjacent the ends of the housing 11 to be threaded into the sill 46. The electrical conductors 21 or 41, as the case may be, extend downwards through apertures through the sill, and lead to any suitable type of energizing device not shown.

Thus it may be seen that we have provided an exceedingly compact, and yet, efficiently operating vehicle signal fully capable of carrying out the objects hereinbefore stated. The particular type of luminous element employed, will stand a great amount of hard usage such as the vibration to which any automobile accessory is continually subjected. However, should the tube 16 become broken, replacement thereof may very easily be effected by the simple expedient of removing the plates 27, whereupon the ends of the broken tube 16 may be removed, and a new tube 16 inserted therefor. The character of electrical contact employed, obviates the necessity of breaking and making new electrical contacts for such replacement.

An important consideration in connection with the particular embodiment of the invention described above, lies in the fact that the surface of the vehicle upon which the signal is mounted, is damaged only to a very small extent, the only alteration of the vehicle necessary, being the provision of holes for the screws 53 and the conductors 21. This is important, in that it permits removal of the signals at any time, and in such a way that a barely perceptible trace of its having been installed thereupon, remains; and these marks may very easily be removed so that the resale value of the vehicle is in no way reduced as a result of the signal's installation. Even this much disfiguration of the surface of the vehicle, may be avoided if the holes through which the fastening screws 53 are to extend, are so arranged that when the device is mounted upon the sill 46 as in Fig. 9, these apertures are in register with the holes in the sill 46 through which fastening screws 54 are normally disposed for the purpose of securing the sill 46 in position. These screws 54 may be removed to permit engagement of the threaded ends of the screws 53 in the same tapped holes as those in which the screws 54 were previously threaded, with the result that the same screws hold the sill 46 and the housing 11 in operative position.

Fig. 10 shows a slightly modified manner of mounting the signal, wherein the housing 11, instead of being mounted upon the sill 46, is affixed to the outer face of the door 49 of the car 51. With the exception of the fact that the fastening screws 53 extend horizontally through the ends of the housing 11, instead of vertically therethrough, this embodiment may be in all respects, the same as that previously described. This method of intallation is possessed of certain advantages. When it is mounted so that the upper face 56 of the housing 11 is in planar alignment with the sill 46, it is obvious that it will in effect, widen the sill, making it more comfortable for the driver to rest his arm upon the sill while operating his vehicle. However, if it be found that in resting his arm upon the top of the housing, the driver tends to hide a portion of the luminous element, it is obvious that the housing 11 may be secured to the door at a point considerably below the sill 46.

Figs. 11 to 14 inclusive, show a slightly modified form of housing 61 and plate 62, for the retention therein of the luminous element 16 which is the same as that employed in the modification previously described. In this embodiment, the anchoring block 62, instead of being provided with rectangularly arranged sides, has its sides 63 flaring outwards to provide, in effect, a flange 64 upon each lateral edge of the blocks 62. Each block 62 is adapted to be mounted in anchoring position by being slipped axially inwards of the associated end of the housing 61, a suitable recess 66 being provided in each end, complementary to the block 62. A cushion 67 of rubber or other suitable resilient material, which forms the continuation of the inner face and outer end of each block 62, is adapted to engage the luminous element 16 and resiliently press the electrode 17 thereof, against the conductor 41 when the fastening screw 68 is tightened, it being understood that a suitable aperture 69 is formed in the block 62, and another aligned aperture 71 formed in the cushion 67, for the screw 68 to pass therethrough. Inasmuch as the same screws 68 may be employed to mount the housing 61 upon the side of the vehicle, the screws 68 may also extend loosely through an aperture 72 in the end of the housing 61, so that its threaded end 73 may extend into a tapped hole in the side of the vehicle or a nut, by means of which the device may be tightened in operative position. Each block 62 is provided with a foot 76 similar to the foot 30, having an arcuate surface 77 conforming to the tube 16.

Various changes may be made in the details of the invention as herein described, without departing from the scope thereof as defined by the appended claims.

We claim:

1. A vehicle side signal comprising an elongated, rigid housing having an opening in the forward face thereof extending longitudinally of said housing, a tube carried within said housing and containing a gas adapted to be rendered luminous by electrical discharge, said tube being visible through said opening, means for conducting energizing current to said tube, and means for mounting said housing upon a side surface of a vehicle with a face of the housing abutting against said surface and with the remainder of the housing projecting outwards therefrom.

2. A vehicle side signal comprising an elongated, rigid housing having an opening in the forward face thereof extending longitudinally of said housing, a tube carried within said housing and containing a gas adapted to be rendered luminous by electrical discharge, said tube being visible through said opening, means for conducting energizing current to said tube, and means for mounting said housing upon a side surface of a vehicle with a face of the housing abutting against said surface and with the remainder of the housing projecting outwards therefrom, said mounting means comprising screws extending through said housing and adapted to be threaded into the body of said vehicle.

In testimony whereof we have signed our names to this specification.

FRANCES ETHEL GRAGG.
LEONARD B. COHN.